Figure 1:
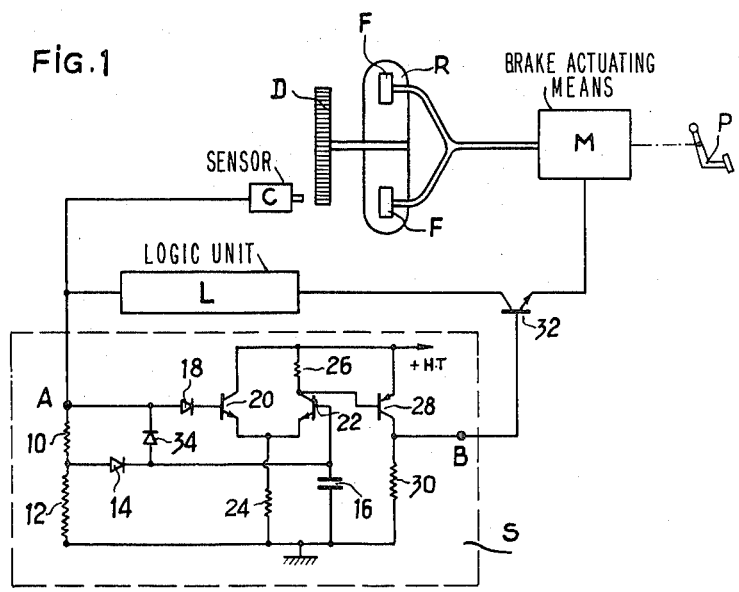

United States Patent [19]
Marouby

[11] 3,795,425
[45] Mar. 5, 1974

[54] ELECTRONIC BRAKING SYSTEM

[75] Inventor: Guy Marouby, Neuilly, France

[73] Assignee: Societe Anonyme D.B.A., Paris, France

[22] Filed: May 24, 1972

[21] Appl. No.: 256,495

[30] Foreign Application Priority Data
June 18, 1971 France .............................. 7122193

[52] U.S. Cl. ............... 303/21 BE, 303/20, 303/21 P
[51] Int. Cl. ............................................... B60t 8/08
[58] Field of Search ..... 188/181; 303/20, 21; 317/5; 324/161–162; 340/52 B, 262–263

[56] References Cited
UNITED STATES PATENTS

| | | | |
|---|---|---|---|
| 3,640,588 | 2/1972 | Carp et al. .......................... | 303/21 P |
| 3,494,671 | 2/1970 | Slavin et al. ....................... | 303/21 P |
| 3,640,589 | 2/1972 | Taniguchi ....................... | 303/21 BE |
| 3,671,083 | 6/1972 | Matsumura ..................... | 303/21 BE |
| 3,578,819 | 5/1971 | Atkins .............................. | 303/21 P |

Primary Examiner—George E. A. Halvosa
Assistant Examiner—Stephen G. Kunin
Attorney, Agent, or Firm—Ken C. Decker; William N. Antonis

[57] ABSTRACT

The invention relates to an electronic anti-skid system which avoids the untimely operating of the system which occurs especially further to the aleatory variations of the wheel speed. A given percentage of the output voltage of a wheel speed sensor is memorized in a capacitor by means of a diode, as soon as the wheel decelerates. The exhaust signal which is given at the output of an anti-skid logic circuitry is transmitted to a transistor only when the wheel speed has decreased of an amount equal to the complementary percentage of the given percentage. The resetting of the devices is effected by another diode which deletes the memorized voltage of the capacitor.

4 Claims, 2 Drawing Figures

ELECTRONIC BRAKING SYSTEM

The present invention relates to an electronic braking system designed to be mounted on wheeled vehicles, and especially on motor vehicles.

According to the invention, there is provided an electronic braking system for at least one wheel, said system including at least one wheel speed sensor delivering a voltage which represents the speed of said wheel, an anti-lock unit which is supplied with said voltage and which in turn delivers an anti-lock signal, braking means associated with said at least one wheel and responsive to said anti-lock signal to decrease the braking force, and inhibition means of said anti-lock signal, characterized by memorizing means memorizing a given percentage of the maximum value of said voltage preceding the advent of said anti-lock signal, comparison means comparing said memorized voltage to said voltage and controlling said inhibition means so that said anti-lock signal is inhibited as long as said voltage is superior to said memorized voltage, and cancelling means deleting said memorized voltage as soon as said voltage becomes inferior of a given amount to said memorized voltage.

In electronic braking systems, in order to avoid the untimely operating of the system which occurs especially further to the aleatory variations of the wheel speed, it is known to memorize a given percentage of the wheel speed voltage just when the anti-lock unit detects that the wheel deceleration becomes superior to a given threshold, and to delay the transmission of the anti-lock signal from the output of this unit to the brake release means until the wheel speed has decreased of a given percentage with respect to its initial value, but no longer than a given period of time.

The braking system according to the invention avoids the hereinabove described untimely operating, without requiring the production of the anti-lock signal and the use of an electronic delay unit to do it. In effect, the instant where the wheel speed voltage is memorized is not determined by the "acceleration" signal, but by the "speed" signal itself when it reaches its maximum value. The result is that the electronic circuitry is simplified, and that the anti-lock system functions more rapidly.

In other words, the present invention avoids that the wheel reaches a too important slippage after it has reached the deceleration threshold, due to the fact that the tolerated slippage percentage is calculated as soon as the wheel decelerates. At the opposite, in known systems, the slippage percentage was calculated only when the wheel had already reached the deceleration threshold.

Figure 2:
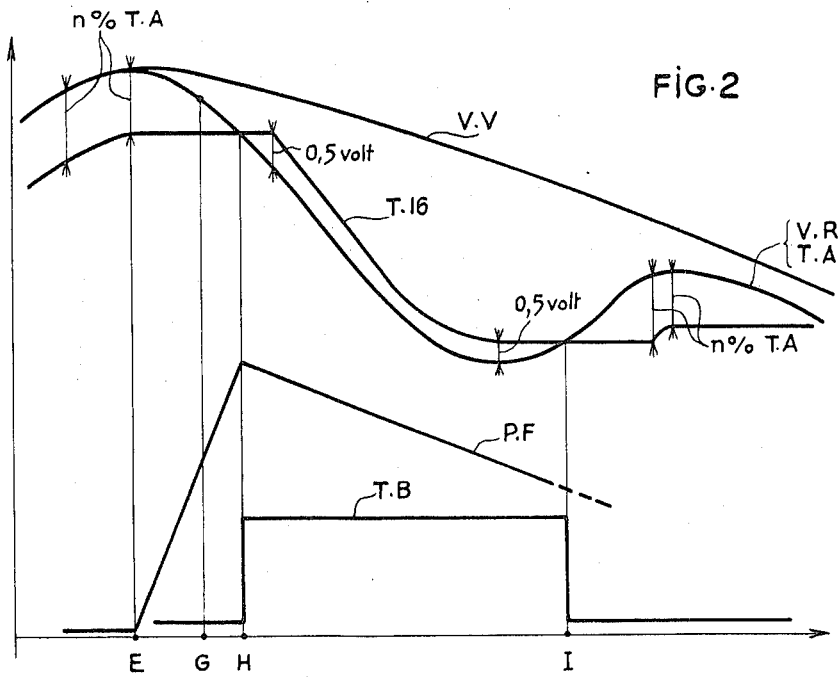

The invention will now be described with reference to the accompanying drawings, in which :

FIG. 1 is a schematic view of an electronic braking system according to the invention and associated with one wheel, and FIG. 2 represents the variations of several quantities relative to elements of FIG. 1, as a function of time.

Referring now to FIG. 1, an electronic braking system is shown, including a wheel speed sensor C, in front of which is rotatively movable a toothed disc D solid with a wheel R provided with a brake F and mounted on a vehicle (not shown).

The sensor C supplies at a point A a direct voltage, which represents the speed of the wheel R, to an anti-lock unit L of any known type. The unit L notably supplies an anti-lock signal, by means of a transistor 32 of the NPN type, to brake actuating means M of any known type, controlled by a pedal P, or to any suitable means actuating the brake F. An electronic device S is located in parallel with the unit L, its input A being connected to the output of sensor C and its output B being connected to the base of the transistor 32.

The device S will be now be described.

The device S includes a divider made from two resistors 10 and 12, which terminals are connected on the one hand to the output A of sensor C, and on the other hand to the ground, the middle terminal charging through a diode 14 a capacitor 16 which one terminal is grounded.

Two transistors 20 and 22 of the NPN type constitute with two resistors 24 and 26 a differential amplifier which is located between a supply source + HT and the ground. The emittors of both transistors 20 and 22 are grounded through the sole resistor 24, and the collector of the transistor 20 is directly connected to + HT whereas the collector of the transistor 22 is connected to the same through the resistor 26.

The base of the transistor 20 is connected to point A through a diode 18 similar to the diode 14, whereas the base of the transistor 22 is connected to the common terminal of capacitor 16 and diode 14. The collector of the transistor 22 is directly connected to the base of a transistor 28 of the PNP type, which emittor is connected to + HT and which collector is connected, on the one hand to the output B, and on the other hand to the ground through a resistor 30. A diode 34 is connected from the common terminal of diode 14 and capacitor 16 to the point A and conducts in this way.

The device shown on FIG. 1 operates as follows. When the output voltage of the sensor C, at point A, has a constant value or is increasing, the transistor 20 is on the "on" state and the transistor 22 is on the "off" state. Thus, the capacitor 16 is charged at a value which is dependent of the resistor divider 10, 12, the direct voltage drop of the diode 14, which amount is about 0,5 Volt, and the value of the voltage at point A.

When the voltage at point A becomes decreasing, for example further to a braking operation of wheel R by means of the brake F, the capacitor 16 remains charged at a voltage which is proportional to the maximum value of the voltage which has been furnished at point A before this decreasing, since the diode 14 prevents the capacitor 16 from discharging.

Supposing that the voltage at point A is sufficiently decreasing so that the voltage supplied to the base of the transistor 20 becomes inferior to the memorized voltage at the terminal of capacitor 16 which is connected to the base of the transistor 22, then the transistor 20 becomes on the "off" state and the transistor 22 becomes on the "on" state, since the base-emitter voltage of the latter becomes positive. The effect is to create in the resistor 26 a voltage drop which sets the transistor 28 on the "on" state. Hence, the transistor 28 makes a voltage appear at point B, which is used to set the transistor 32 on the "on"state. The latter is mounted like a switch in the output line of the unit L which provides the anti-lock signal. Thus, the transistor 32 is on the "on" state as long as the voltage at point A is decreasing, and the anti-lock signal can be transmitted to and utilized by the brake actuating means M in order to decrease the braking force. Simultaneously, the capacitor 16 discharges through the diode 34 and the resistors 10 and 12, so that its voltage equalizes the voltage at point A increased of the direct voltage drop of the diode 34.

The decreasing of the braking force makes consequently the speed of the wheel R increase, and hence the voltage at point A increases too. As soon as the voltage at point A becomes superior to its minimum value of an amount equal to the direct voltage drop of the diode 34 (0,5 Volt), the transistor 20 becomes on the "on" state and the transistor 22 on the "off" state. Consequently, the transistor 32 is set on the "off" state and prevents again the anti-lock signal from being transmitted.

The diode 18, which is similar to the diode 14, is only used so as to provide, between the point A and the base of the transistor 20, a voltage drop equal to the voltage drop which is imposed by the diode 14 between the middle terminal of the divider and the capacitor 16, and thus to respect the divider ratio.

The operation of an anti-lock cycle will be better understood with reference to FIG. 2, which shows, as a function of the time, the variations of the vehicle speed (curve V.V), of the wheel speed (curve V.R), of the voltage at point A (curve T.A similar to curve V.R), of the voltage at the terminal of the capacitor 16 (curve T.16), of the output voltage at point B (curve T.B), and finally of the braking force (curve P.F).

The point E represents the moment where the braking force is initiated by the brake F, further to the actuation of the brake pedal P.

The point G corresponds to the deceleration threshold tolerated by the unit L, and hence corresponds to the moment where the anti-lock signal is provided at the collector of the transistor 32.

At point H, the transistor 22 which becomes on the "on" state, sets the transistor 32 on the "on" state, and thus makes the anti-lock signal be transmitted and makes the braking force begin to decrease.

At point I, the transistor 22 sets "off" again and allows the system to operate another anti-lock cycle.

According to the existing circumstances, the point G, at which the anti-lock signal is initiated, may be situated on the right side of the point H viewing FIG. 2, in which instance the anti-lock cycle takes place as if the device S did not exist.

What is claimed is:

1. An electronic braking system for at least one wheel, said system including at least one wheel speed sensor delivering a voltage which represents the speed of said wheel, an anti-lock unit which is supplied with said wheel speed voltage and which in turn delivers an anti-lock signal, braking means associated with said at least one wheel and responsive to said anti-lock signal to decrease the braking force, and means for inhibiting said anti-lock signal, said inhibiting means including memorizing means memorizing a given percentage of the maximum value of said wheel speed voltage preceding the advent of said anti-lock signal, comparison means comparing said memorized voltage to said wheel speed voltage and controlling said inhibiting means so that said anti-lock signal is inhibitied as long as said wheel speed voltage is superior to said memorized voltage, and cancelling means deleting said memorized voltage as soon as said wheel speed voltage becomes inferior to a given amount to said memorized voltage; said memorizing means including energy storage means and means charging said energy storage means to a value corresponding to said given percentage of said wheel speed voltage as long as said wheel speed voltage increases, said cancelling means including means preventing decrease of the value stored in said energy storage means until said wheel speed voltage decreases below the corresponding value stored in said energy storage means by said given amount, whereupon the value stored in said energy storage means decreases in proportion of the decrease in said wheel speed voltage.

2. An electronic braking system according to claim 1, characterized in that said energy storage means includes a capacitor, said means charging said energy storage means includes a resistor divider supplied with said wheel speed voltage and having a middle terminal connected to said capacitor for charging the latter, and a first diode connected between said middle terminal and said capacitor.

3. An electronic braking system according to claim 2, characterized in that said comparison means include a transistor differential amplifier which inputs receive, on the one hand, said wheel speed voltage through a second diode similar to said first diode, and on the other hand, said memorized voltage, the output signal of said differential amplifier being amplified by a transistor and the latter controlling said inhibition means.

4. An electronic braking system for at least one wheel, said system including at least one wheel speed sensor delivering a voltage which represents the speed of said wheel, an anti-lock unit which is supplied with said wheel speed voltage and which in turn delivers an anti-lock signal, braking means associated with said at least one wheel and responsive to said anti-lock signal to decrease the braking force, and means for inhibiting said anti-lock signal, said inhibiting means inhibiting memorizing means memorizing a given percentage of the maximum value of said wheel speed voltage preceding the advent of said anti-lock signal, comparison means comparing said memorized voltage to said wheel speed voltage and controlling said inhibiting means so that said anti-lock signal is inhibited as long as said wheel speed voltage is superior to said memorized voltage, and cancelling means deleting said memorized voltage as soon as said wheel speed voltage becomes inferior to a given amount to said memorized voltage; said memorizing means including a resistor divider supplied with said wheel speed voltage and which middle terminal charges a capacitor through a first diode;

said cancelling means including a third diode which is connected from the common terminal of said capacitor and said first diode to the supply terminal of said divider, and which conducts in this way.

* * * * *